(No Model.)
A. HAID.
SECONDARY BATTERY.
No. 271,628. Patented Feb. 6, 1883.
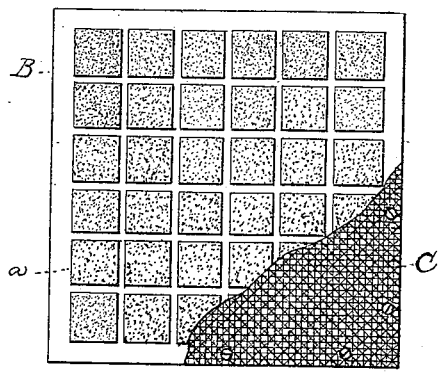
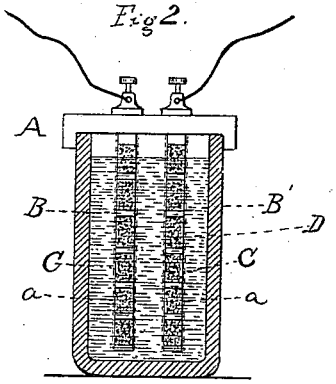
WITNESSES:
INVENTOR:
Alfred Haid,
By Rich N. Dyer
Atty.

UNITED STATES PATENT OFFICE.

ALFRED HAID, OF RAHWAY, NEW JERSEY, ASSIGNOR TO THE EDISON ELECTRIC LIGHT COMPANY, OF NEW YORK, N. Y.

SECONDARY BATTERY.

SPECIFICATION forming part of Letters Patent No. 271,628, dated February 6, 1883.

Application filed September 13, 1882. (No model.)

*To all whom it may concern:*

Be it known that I, ALFRED HAID, of Rahway, in the county of Union and State of New Jersey, have invented a certain new and useful Improvement in Secondary Batteries, of which the following is a specification.

The object of my invention is to produce a secondary or storage battery whose weight and size shall be much less than those hitherto in use, while it will be of unusual strength and solidity throughout all its parts.

In my secondary battery I use two or a series of frames, preferably of iron coated with lead or tin, and each provided with a number of apertures, preferably of square or oblong form. Such apertures are made as large and placed as near together as is consistent with giving strength and rigidity to the frame. The apertures of one frame are filled with a compound of spongy Prussian blue and those of the other with oxide of lead or other suitable lead compound; and where a series of frames is used alternate frames are filled respectively with these substances. The process of charging the battery converts the Prussian blue into a white or bluish-white compound containing less oxygen than before, but having a great affinity for that gas, while the lead oxide is converted into a peroxide or even a higher oxide of lead. The exciting agent used is preferably dilute sulphuric acid. When the battery is short-circuited for discharging, the substances which fill the frames are reconverted into their original forms of Prussian blue and oxide of lead, respectively, and an electric current is thus produced by this reaction. The substances are held in the apertures of the frames by screens or coverings, preferably a net-work of thin bamboo, somewhat similar to the cane seats of chairs. These are held closely by screws or other suitable fastenings, a screen being placed on each side of each frame. Instead of the bamboo screen, a net-work of lead-covered iron wire may be used, if desired.

Instead of iron frames, wooden ones covered with lead may be used, in which case round openings instead of square ones could be employed to advantage, as they can be more readily bored out.

In the accompanying drawings, Figure 1 is an elevation of one of the frames described, and Fig. 2 a vertical transverse section of the cell containing a pair of such frames.

A is the cell, and B B' the frames suspended therein, one containing Prussian blue in its apertures *a a*, the other having lead oxide in such apertures.

C C' are the woven screens of bamboo, which hold the chemical substances in place. Most of the screen is broken away in Fig. 1 to afford a view of the frame.

D is the diluted sulphuric acid of the cell.

What I claim is—

1. In a secondary electric battery, the frames for holding the active material, made of iron covered with tin or lead, and having apertures in which such active material is placed, substantially as set forth.

2. In a secondary electric battery, the alternate plates or frames, filled respectively, before charging, with spongy Prussian blue and oxide of lead, substantially as set forth.

3. In a secondary electric battery, the combination with the lead-covered or tin-covered iron frames having apertures for containing the active material, of a suitable covering for retaining such material in place, substantially as set forth.

4. In a secondary electric battery, the combination, with the lead-covered or tin-covered iron frames having apertures for containing the active material, of screens or coverings of woven bamboo, placed one on each side of the frame, substantially as set forth.

5. In a secondary electric battery, a filling composed, before charging, of spongy Prussian blue, substantially as set forth.

This specification signed and witnessed this 8th day of August, 1882.

ALFRED HAID.

Witnesses:
H. W. SEELY,
EDWARD H. PYATT.